United States Patent [19]
Hopkinson et al.

[11] Patent Number: 5,249,271
[45] Date of Patent: Sep. 28, 1993

[54] BUFFER MEMORY DATA FLOW CONTROLLER

[75] Inventors: Scott Hopkinson, Long Beach; James H. Wang, Mission Viejo, both of Calif.

[73] Assignee: Emulex Corporation, Costa Mesa, Calif.

[21] Appl. No.: 20,058

[22] Filed: Feb. 19, 1993

Related U.S. Application Data

[63] Continuation of Ser. No. 534,028, Jun. 4, 1990.

[51] Int. Cl.⁵ .............................................. G06F 13/00
[52] U.S. Cl. ..................... 395/250; 395/275
[58] Field of Search ................ 395/250, 275, 425; 364/DIG. 1, DIG. 2

[56] References Cited

U.S. PATENT DOCUMENTS

| | | | |
|---|---|---|---|
| 4,258,418 | 3/1981 | Heath | 395/250 |
| 5,136,582 | 8/1992 | Firoozmand | 370/85.1 |

*Primary Examiner*—Robert L. Richardson
*Attorney, Agent, or Firm*—Spensley Horn Jubas & Lubitz

[57] ABSTRACT

A data flow control system for regulating the flow of data through a buffer memory in a data storage system controller. The data flow controller system includes an up-down counter that is decremented for every byte of data that is placed into the controller's buffer memory, and incremented for every byte of data that is taken out of the buffer memory. The counter is preset to an initial value that represents the minimum amount of data that must be in the buffer memory before that data can be released to the storage system or to the computer interface, thereby permitting validation of the data prior to release. The value of the counter represents the amount of data that is in the buffer memory less the initial offset value. Detector circuitry coupled to the counter enables or disables the storage system or the computer interface depending upon the validity of the data in the buffer memory and the operational status of the storage system and the computer interface. An additional feature of the invention permits using the buffer memory as a cache for data read from the storage system. Intermediate status information about the buffer memory is generated in order to permit the storage system controller microprocessor to anticipate operational states, and improve data transfer efficiency. By directly controlling the data flow through the buffer memory, the storage system controller microprocessor is not directly involved in all aspects of data transfers, and therefore it is not required to operate at the higher speeds necessary with present day and future storage systems.

30 Claims, 3 Drawing Sheets

BUFFER MEMORY DATA FLOW CONTROLLER

This application is a continuation application of U.S. patent application Ser. No. 07/534,028, filed Jun. 4, 1990.

BACKGROUND OF THE INVENTION

1. Field of the Invention

This invention relates to a controller for data storage systems, and more particularly to a control system for regulating the flow of data through a buffer memory in a mass data storage system controller.

2. Related Art

Mass data storage systems are used in conjunction with computers to store large quantities of data. Such mass data storage systems include, for example, direct access storage devices using magnetic media or optical media.

Mass data storage systems typically use a controller subsystem to control the operation of the storage system and execute commands from a computer system. Such commands include READ and WRITE commands. For example, a magnetic or optical disk drive that is coupled to a computer via a Small Computer System Interface ("SCSI") uses a controller to interpret commands that conform to the SCSI protocol and to control the operation of the disk drive such that those commands are properly executed. Such controllers typically have a buffer memory for temporarily storing data that is to be read from or written to the storage system.

A buffer memory serves several functions, including adapting the input and output rates of the storage system to the input and output rates of the computer interface, and temporarily holding data before release until such time as the validity of the data is determined by means of an error correction process. Typical sizes of such a buffer memory are approximately 48,000 to 64,000 bytes of data.

Controllers in the past have been designed around a microprocessor that, under computer program control, monitors and controls all operations in the controller. For example, if a sector (typically 180 to 512 bytes) of data is read from a storage system into a buffer memory, the microprocessor controls every state of the transfer from the disk into the buffer memory, validation of the data in the buffer memory (by means of an error correction code ("ECC") also read from the storage system), and the release of valid data from the buffer memory to the computer interface. Such control by the microprocessor is typically initiated and controlled by the receipt of one or more interrupt signals from the storage system, the buffer memory, or the computer interface.

In the past, commonly available microprocessor technology has been adequate to handle such programmed control tasks, because the serial data rate of storage systems has been in the range of 10 to 16 MHz. However, market demands for increasing data rates have pushed serial data transfer speeds into the range of 32 to 48 MHz, and it is predictable that the data transfer rate will increase in the future. Reasonably priced microprocessors are not capable of handling and processing interrupt signals for each data sector at such high serial data transfer rates.

It is therefore desirable to provide a means that eliminates the need for microprocessor control of a substantial part of the data transfer process between a computer interface and a mass data storage system. Such a means can permit the continued use of commonly available, low priced microprocessor technology without requiring more expensive microprocessors capable of operating at higher data rates.

The present invention provides such a means using low-cost components to substantially bypass direct control of data flow by the controller's microprocessor.

SUMMARY OF THE INVENTION

The present invention comprises a data flow controller system that includes an up-down digital counter that is decremented for every byte of data that is placed into the controller's buffer memory, and incremented for every byte of data that is taken out of the buffer memory. The counter is preset to an initial value that represents the minimum amount of data that must be in the buffer memory before that data can be released to the storage system or to the computer interface. This permits validation of the data prior to release, and permits accumulation of a minimum amount of data before writing to the storage system. The value of the counter at any one time represents the amount of data currently in the buffer memory less the initial offset value. Detector circuitry coupled to the counter enables or disables the storage system or the computer interface depending upon the validity of the data in the buffer memory and the operational status of the storage system and the computer interface.

Intermediate status information about the buffer memory is generated in order to permit the storage system controller microprocessor to anticipate operational states, and improve data transfer efficiency.

An additional feature of the invention permits using the buffer memory as a cache for data read from the storage system.

By directly controlling the data flow through the storage system controller's buffer memory, the storage system controller microprocessor is not directly involved in all aspects of data transfers. Thus, the microprocessor is not required to operate at the higher speeds necessary with present day and future mass data storage systems. The invention therefore permits control of high performance storage systems with less expensive circuitry.

The details of one embodiment of the present invention are set forth below. Once the details of the invention are known, numerous additional innovations and changes will become obvious to one skilled in the art.

DETAILED DESCRIPTION OF THE INVENTION

Throughout this description, the preferred embodiment and examples shown should be considered as exemplars, rather than limitations on the structure and methods of the present invention.

Figure 1A:
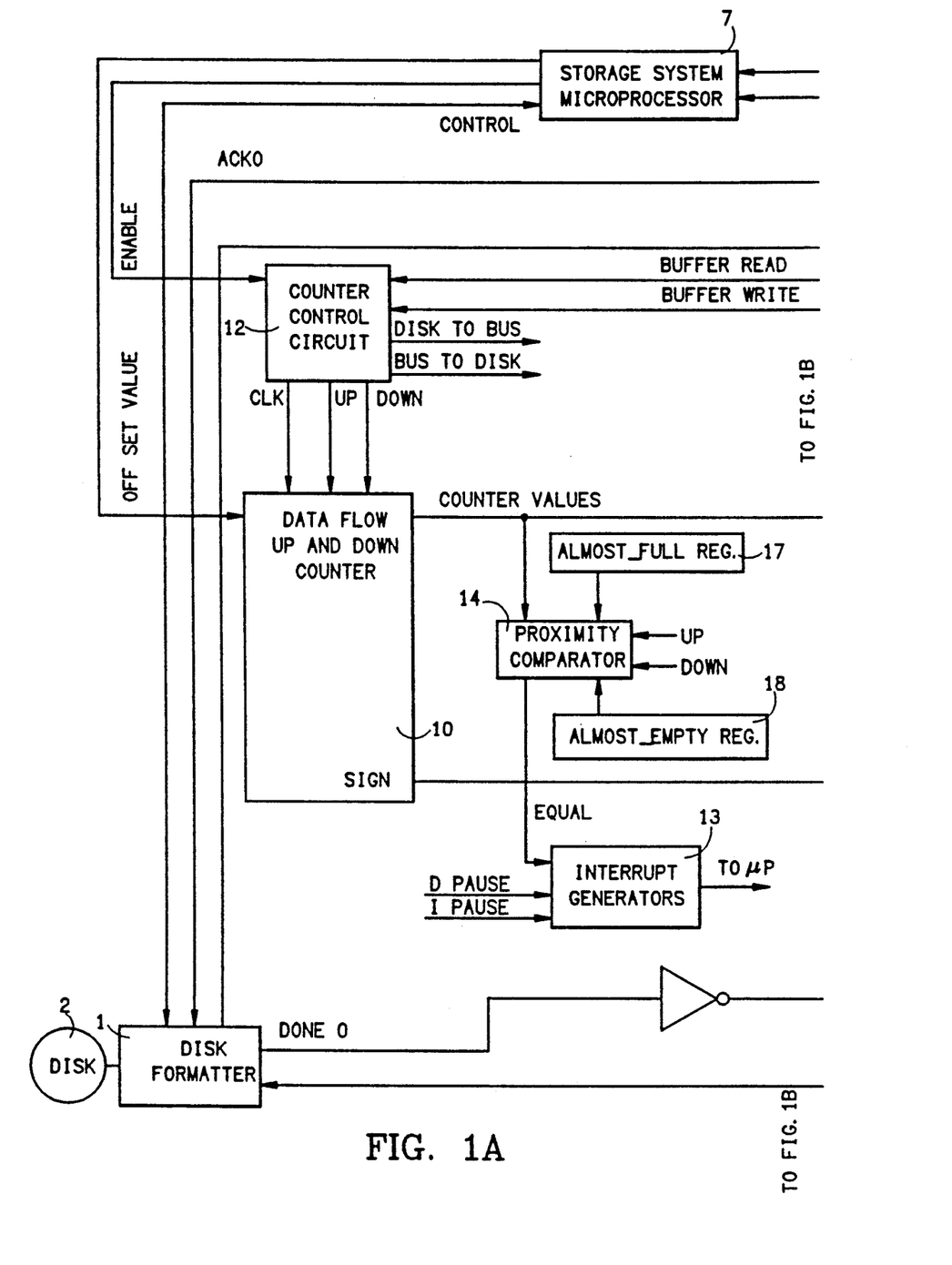
FIGS. 1A and 1B are schematic diagrams showing the preferred embodiment of the inventive data flow controller system.
Figure 1B:
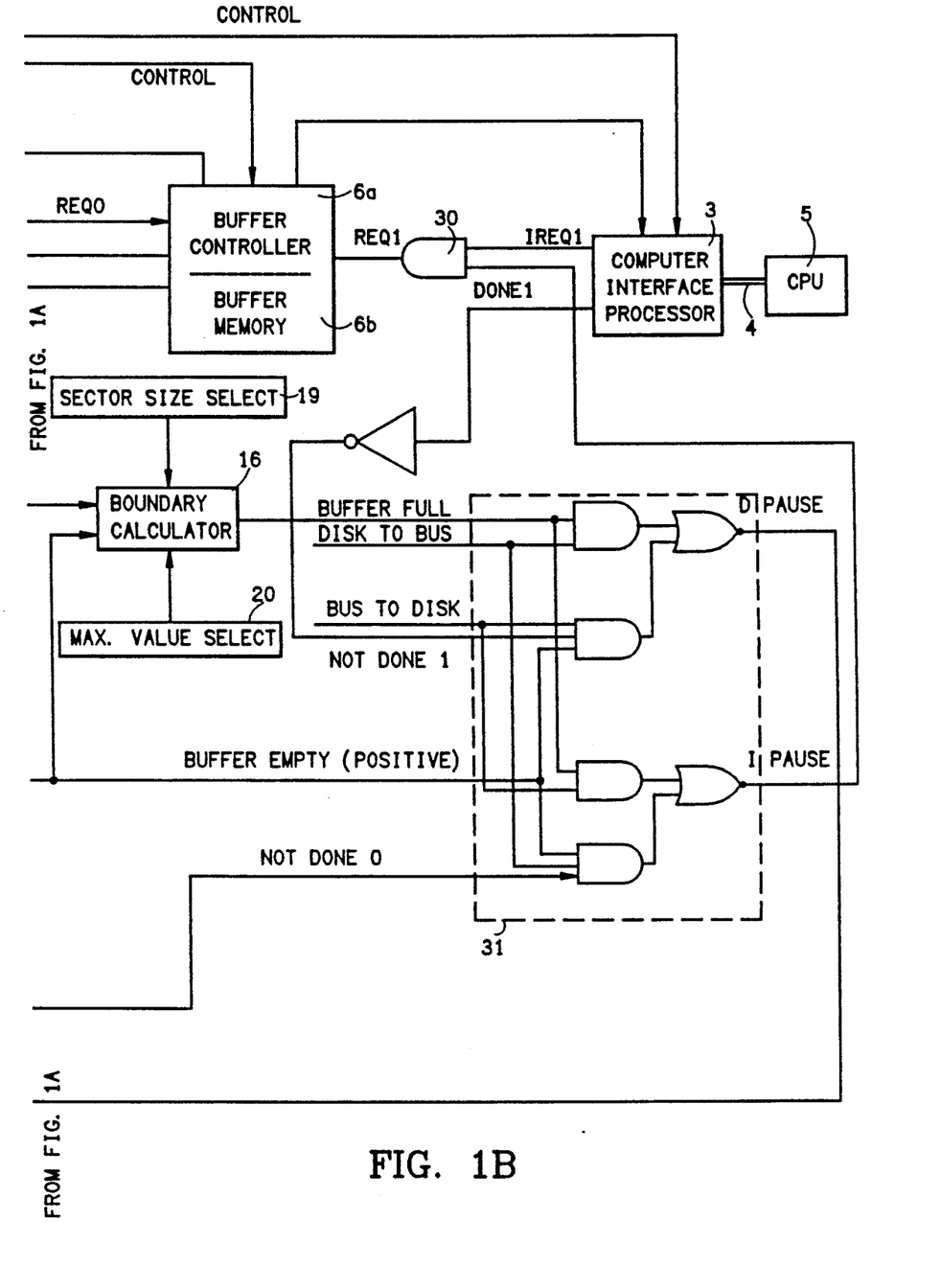

FIG. 1 is schematic diagram showing the preferred embodiment of the inventive Data Flow Controller System (DFCS). The DFCS is part of the storage system controller (SSC) that manages the overall operation of the mass data storage system.

The disk formatter 1 is a low-level device controller that controls the seeking, reading, writing and error correction operations of a mass data storage system 2 (e.g., a magnetic or optical disk) in known fashion. The computer interface processor 3 (for example, for a SCSI interface) controls the passing of data between the SSC and a computer system bus 4 in known fashion. Data transmission can be between the SSC and any other device (such as a central processor unit 5) that can communicate over the computer system bus 4.

The buffer memory controller 6 operates like similar buffer memory controllers known in the art, with the exception that the majority of data flow events through the SSC are governed by the DFCS circuitry coupled to the buffer memory controller 6. Although the buffer memory 6b is generally physically separate from the buffer memory controller 6a, for purposes of understanding the operation of the DFCS, the buffer memory 6b may be considered a part of the buffer memory controller 6a.

The DFCS includes an up/down counter 10, which in the preferred embodiment as a 17-bit or 19-bit counter. The counter 10 may be preset from an external source (such as the SSC microprocessor 7) to an offset value. A typical value for the offset would be the size in bytes of a data sector on the storage system 2. For example, if a storage system sector stores 512 bytes, the offset value would normally be set to 512. (In practice, it may be necessary to set the offset value at one or two bytes more than the desired actual offset, to allow for time delays through the DFCS logic circuitry). In the preferred embodiment, the offset value is loaded into the counter 10 as a positive number.

A counter control circuit 12 is coupled to BUFFER READ and BUFFER WRITE control signals from the buffer memory controller 6a, and to the counter 10. The BUFFER READ and BUFFER WRITE signals respectively indicate the transfer of each byte into or out of the buffer memory 6b.

The counter control circuit 12 decrements the counter 10 via a DOWN signal for every byte of data that is stored in the buffer memory 6b, and increments the counter 10 via an UP signal for every byte of data that is taken out of the buffer memory 6b. The counter control circuit 12 also controls a clock signal, CLK, for regulating the incrementing and decrementing of the counter 10. An ENABLE control signal to the counter control circuit 12 from the SSC microprocessor 7 allows the DFCS circuitry to be disabled, thereby returning full control of the SSC to the SSC microprocessor 7.

The SSC microprocessor 7 is coupled to the disk formatter 1, the computer interface processor 3, and the buffer memory controller 6a by control lines, permitting the SSC to operate in standard fashion when the DFCS circuitry is disabled.

The offset value preset in the counter 10 represents the minimum amount of data that must be in the buffer memory before that data can be released to the storage system 2 or to the computer interface processor 3. The value of the counter 10 at any one time represents the amount of data currently in the buffer memory 6b less the initial offset value. In the preferred embodiment, the counter 10 is decremented when bytes are stored in the buffer memory 6b, and incremented when bytes are taken out of the buffer memory 6b. Thus, because the offset value is stored as a positive number, the counter 10 value will change from a negative number to a positive number when enough bytes have been stored in the buffer memory 6b to equal the offset value plus one byte. This change in sign is indicated by the SIGN signal generated by the counter 10.

The offset value also represents the minimum amount of valid data in the buffer memory 6b for single-sector transfers. During a READ operation, a stream of data bytes are read from the disk and stored in the buffer memory 6b. The counter 10 tracks the number of bytes so stored. The data stream is also used to generate an error correction code (ECC) value that is compared to an ECC value stored at the end of the block of data being read. The SSC cannot determine if the block of data is error-free until all of the data has been read into the buffer memory 6b and the ECC comparison made. If an error has occurred in a sector that has been read into the buffer memory 6b, the disk formatter 1 does not read any further data from the storage system 2. The buffer memory 6b therefore does not receive another byte of data, and the SIGN signal remains positive. Because the counter 10 value normally must be negative for a transfer out of the buffer memory 6b to occur, the erroneous data in the buffer memory 6b is never released to the computer interface processor 3. The DFCS circuitry therefore prevents the transmission of data to the computer interface processor 3 until the data is determined to be valid.

In normal operation, the disk formatter 1 interacts with the buffer controller 6a by means of a request signal REQ0 and an acknowledgment signal ACK0, in known fashion. Similarly, the computer interface processor 3 interacts with the buffer controller 6a by means of a request signal IREQ1 (which in the preferred embodiment is coupled to the buffer controller 6a through an AND gate 30 as an REQ1 signal) and an acknowledgment signal ACK1, in known fashion. However, the issuance of the REQ0 signal by disk formatter 1 and the receipt of the IREQ1 signal by the buffer controller 6a are controllable by the DFCS circuitry. Detector circuitry coupled to the counter 10 in effect enables or disables the storage system 2 or the computer interface processor 3 depending upon the amount of data in the buffer memory 6b and the operational status of the storage system 2 and the computer interface processor 3. Such enablement and disablement are accomplished by means of a D-PAUSE signal (for pausing the disk storage system 2) and an I-PAUSE signal (for pausing the computer interface processor 3).

The counter control circuit 12, described above, generates a DISK TO BUS signal during a READ operation (the transfer of data from the storage system 2 to the bus 4 via the computer interface processor 3), based upon the presence of a BUFFER READ signal. The counter control circuit 12 generates a BUS TO DISK signal during a WRITE operation (the transfer of data from the bus 4 via the computer interface processor 3 to the storage system 2), based upon the presence of a BUFFER WRITE signal. The circuitry for generating the DISK TO BUS and BUS TO DISK signals may be simple latch circuits, set by the occurrence of respective BUFFER READ and BUFFER WRITE signals, and reset by the occurrence of the opposite signal. The DISK TO BUS and BUS TO DISK signals are used in the DFCS circuitry as control signals for generating the D-PAUSE and I-PAUSE signals, as explained below.

During a READ operation (i.e., a DISK TO BUS transfer), if the buffer memory 6b becomes full, a D-

PAUSE signal is generated and transmitted to the disk formatter 1 to temporarily halt disk reading. Conversely, if the buffer memory 6b becomes "empty" (i.e., the amount of data in the buffer memory 6b falls below the offset value, causing the SIGN signal to become positive), an I-PAUSE signal is generated and coupled to AND gate 30 to block all IREQ1 signals from being transmitted to the buffer controller 6a as a REQ1 signal, thereby halting data transfers from the buffer memory 6b to the bus 4.

During a WRITE operation (i.e., a BUS TO DISK transfer), if the computer interface processor 3 has not received enough data from the bus 4 to store a full sector in the buffer memory 6b (i.e., the amount of data in the buffer memory 6b is below the offset value, causing the SIGN signal to be positive), a D-PAUSE signal is generated and transmitted to the disk formatter 1 to temporarily halt disk writing. Conversely, if the buffer memory 6b becomes full, an I-PAUSE signal is generated and coupled to AND gate 30 to block all IREQ1 signals from being transmitted to the buffer controller 6a as an REQ1 signal, thereby halting data transfers from the bus 4 to the buffer memory 6b.

The I-PAUSE and D-PAUSE signals are also coupled to an interrupt generator 13. The output of the interrupt generator 13 is coupled to the SSC microprocessor 7. This permits the SSC microprocessor 7 to monitor the DFCS and control the SSC on an interrupt basis, without the SSC microprocessor 7 having to continuously read and test specific data values to determine the data "level" in the buffer memory 6b.

In the preferred embodiment, data transfers between the disk formatter 1 and the storage system 2 are halted on a sector boundary so that sectors of data are always handled as a complete unit. This is especially important when writing data in order to prevent corruption of data on the storage system 2.

After the disk formatter 1 has completed storing the last sector of a multi-sector READ operation into the buffer memory 6b, a special DONE0 control signal is generated by the disk formatter 1 to release the I-PAUSE signal, and permit the computer interface processor 3 to retrieve the last sector of data in the buffer memory 6b for transmission over the bus 4. This feature thus overrides a positive value for the SIGN signal. The DONE0 signal is only generated if the last sector was read without error.

Similarly, after the computer interface processor 3 has completed storing the last sector of a multi-sector WRITE operation into the buffer memory 6b, a special DONE1 control signal is generated by the computer interface processor 3 to release the D-PAUSE signal, and permit the disk formatter 1 to retrieve the last sector of data in the buffer memory 6b for writing to the storage system 2. This feature thus overrides a positive value for the SIGN signal. In some embodiments, the computer interface processor 3 cannot generate a DONE1 signal. In such a case, the computer interface processor 3 can generate an interrupt to the SSC microprocessor 7, indicating the completion of the WRITE operation. The SSC microprocessor 7 can then disable the DFCS circuitry and transfer the last sector of data in the buffer memory 6b to the disk formatter 1 for writing, in known fashion.

The D-PAUSE and I-PAUSE signals are generated by monitoring the count value of the counter 10. The count value of the counter 10 is coupled to a proximity comparator 14 and a boundary calculator 16. The proximity comparator 14 is coupled to an ALMOST FULL register 17 and an ALMOST EMPTY register 18, as well as to the UP and DOWN count signals from the counter control circuit 12. The values in the ALMOST FULL register 17 and the ALMOST EMPTY register 18 may be fixed, but are preferably programmable by the SSC microprocessor 7.

When the value in the ALMOST FULL register 17 or the ALMOST EMPTY register 18 equals the counter 10 value, the proximity comparator 14 generates an EQUAL signal that is coupled to the interrupt generator 13. These registers thus act as "threshold" registers that cause the generation of an interrupt to the SSC microprocessor 7 when the buffer memory 6b is either almost full or almost empty. This permits the SSC microprocessor 7 to monitor the DFCS and control the SSC on an interrupt basis, without the SSC microprocessor 7 having to continuously read and test specific data values to determine the data "level" in the buffer memory 6b.

The UP signal is used to control the proximity comparator 14 such that a comparison is made between the counter 10 value and the ALMOST FULL register 17 only when the counter 10 is being incremented. This prevents an erroneous indication that the buffer memory 6b is almost full when data is being taken out of the buffer memory 6b after having passed the almost full state. Similarly, the DOWN signal is used to control the proximity comparator 14 such that a comparison is made between the counter 10 value and the ALMOST EMPTY register 18 only when the counter 10 is being decremented. This prevents an erroneous indication that the buffer memory 6b is almost empty when data is being stored in the buffer memory 6b after having passed the almost empty state.

The ALMOST FULL register 17 and the ALMOST EMPTY register 18 permit certain economies of data transfer operation. For example, if the buffer memory 6b is large (e.g., 64K bytes), the CPU 5 can request that a large block of data (substantially more than a sector) be read, that the computer interface processor 3 disconnect from the bus 4 until the data has been read from the storage system 2 and stored in the buffer memory 6b, and that the computer interface processor 3 then reconnect to the bus 4 for transmission of the data to the CPU 5. By setting the ALMOST FULL register 17 to some fraction (e.g., 80%) of the desired block size, the DFCS can generate an interrupt to the SSC microprocessor 7 when that amount of data has been read from the storage system 2 into the buffer memory 6b. The interrupt would permit the SSC microprocessor 7 to reconnect the SSC to the bus 4 and begin transferring data to the CPU 5 while the disk formatter 1 continues to read data from the storage system 2 into the buffer memory 6b. Consequently, because the flow of data from the storage system 2 is generally not stopped because the buffer memory 6b is full, the efficiency of the SSC is substantially increased. Importantly, this improvement is achieved by removing the SSC microprocessor 7 from handling intermediate process steps which are instead handled by the DFCS, thereby permitting the use of a slower microprocessor.

Similarly, by being able to detect when the buffer memory 6b is almost empty, an interrupt to the SSC microprocessor 7 can be generated, thereby enabling control of the disk formatter 1 and the computer interface processor 3 to prevent all of the data from being taken out of the buffer memory 6b before steps are taken to obtain new data that may be waiting.

The boundary calculator 16 is coupled to a sector size select register 19 and a maximum value select register 20. The values in the sector size select register 19 and the maximum value select register 20 are preferably programmable by the SSC microprocessor 7. The value set in the maximum value select register 20 represents the maximum size of the buffer memory 6b, thus permitting the DFCS to be used with buffer memories of different sizes. The value set in the sector size select register 19 is the sector size of the storage system 2. This permits the DFCS to be used with storage systems having different sector sizes.

The boundary calculator 16 subtracts the value in the sector size select register 19 from the value in the maximum value select register 20 to determine a BUFFER MAX value. When the BUFFER MAX value is equal to the counter 10 value, the boundary calculator 16 generates a BUFFER FULL signal. The reason the sector size is subtracted from the maximum buffer size value is to permit at least one more sector of data to be stored in the buffer memory 6b, thereby allowing READ operations to complete on a sector boundary.

The BUFFER FULL signal is coupled to a set of gates 31, which generate the D-PAUSE signal and the I-PAUSE signal. The DISK TO BUS and BUS TO DISK signals are also coupled to the gates 31, along with the DONE0, DONE1, and SIGN signals. The D-PAUSE signal is generated whenever the buffer memory 6b is full during a DISK TO BUS transfer, or whenever the buffer memory 6b is "empty" (as indicated by the SIGN signal) during a BUS TO DISK transfer and the computer interface processor 3 is not done transferring data (as indicated by the DONE1 signal). The I-PAUSE signal is generated whenever the buffer memory 6b is full during a BUS TO DISK transfer, or whenever the buffer memory 6b is empty (as indicated by the SIGN signal) during a DISK TO BUS transfer and the disk formatter 1 is not done transferring data (as indicated by the DONE0 signal).

Figure 2:
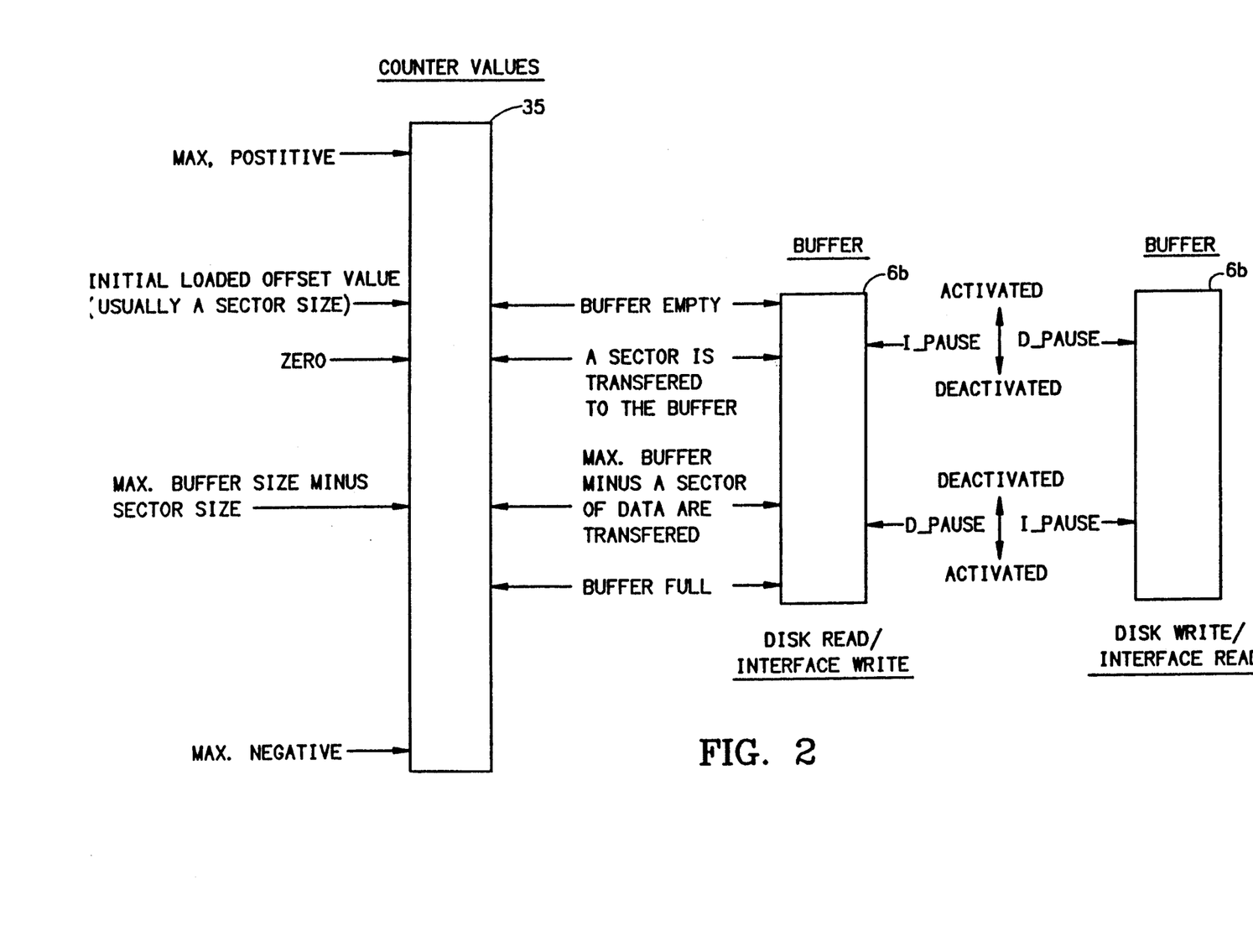
FIG. 2 is a block diagram showing the relationship of counter values to buffer states for the preferred embodiment of the present invention. Like numbers and designations in the drawings refer to like elements.

FIG. 2 is a block diagram graphically showing the relationship of counter values 35 in the counter 10 to various states of the buffer memory 6b for the preferred embodiment of the present invention. The buffer memory 6b is actually empty when the counter value 35 equals the initial loaded offset value. When the counter value 35 is zero, then a sector of data has been transferred into the buffer memory 6b. If the zero count value is passed while taking data out of the buffer memory 6b, then the buffer memory 6b is "empty", and the I-PAUSE signal is generated during a disk READ operation, while the D-PAUSE signal is generated during a disk WRITE operation.

If the counter value 35 is equal to the maximum buffer size less one sector size, then the buffer memory 6b is "full". If this count value is passed while storing data into the buffer memory 6b, then the D-PAUSE signal is generated during a disk READ operation, while the I-PAUSE signal is generated during a disk WRITE operation.

In between the "empty" count value and the "full" count value, neither the I-PAUSE nor the D-PAUSE signals are generated. The values of the ALMOST EMPTY register 17 and the ALMOST FULL register 18 can be set for any intermediate count value, and commonly would be set as a percentage of the buffer memory 6b size (e.g., 20% of the buffer memory 6b size for "almost empty", and 80% of the buffer memory 6b size for "almost full").

An additional feature of the invention permits using the buffer memory 6b as a cache for data read from the storage system 2. If the SSC implements disk caching, and the CPU 5 sends a READ request to the SSC that includes data already in the buffer memory 6b, the SSC microprocessor 7 can send a negative (rather than a positive) offset value to the counter 10. The offset value represents the amount of valid data already in the buffer memory 6b, less one sector size.

By setting the counter 10 to a negative value, the DFCS responds as if the data in the buffer memory 6b was instantaneously read from the storage system 2 and stored in the buffer memory 6b. Since the SIGN signal is forced to a negative value, the previously "cached" data is immediately released to the computer system bus 4.

In situations where part of the data that has been requested is in the buffer memory 6b and the balance of the requested data is on the storage system 2 (to be read), pre-setting the counter 10 to a negative value allows the data that has been "cached" in the buffer memory 6b to be sent immediately to the computer system bus 4. The SSC then reads the remaining data through the DFCS in normal fashion, as described above. System throughput is increased because the CPU 5 can operate on the cached data very quickly, while the remaining data is read and validated through the DFCS.

In summary, the DFCS essentially permits data to accumulate in the buffer memory 6b without attention from the SSC microprocessor 7 until the data is ready for transmission, thus off-loading much of the transfer process operation from the SSC microprocessor 7 to the DFCS. In addition, the DFCS permits a number of operational efficiencies in data transfer by its ability to detect various intermediate buffer states and use an interrupt mechanism to transfer control of the SSC to the SSC microprocessor 7.

A number of embodiments of the present invention have been described. Nevertheless, it will be understood that various modifications may be made without departing from the spirit and scope of the invention. For example, the DFCS of the present invention can be readily adapted for use with data storage systems other than magnetic or optical disks, such as magnetic tape or solid-state storage systems. Further, the counter 10 may be implemented to count oppositely from the manner described for the counter 10 of the preferred embodiment. Accordingly, it is to be understood that the invention is not to be limited by the specific illustrated embodiment, but only by the scope of the appended claims.

We claim:

1. A buffer memory data flow controller, coupled to a microprocessor, a buffer controller, a buffer memory, an interface processor, and input/output device controller, for controlling the transfer of data between the interface and the input/output device controller, the data flow controller comprising:

a. a counter including validation means for generating a validation signal when the amount of data in the buffer memory equals a preset comparison value;
   b. counter control means, coupled to the counter, for changing the count value of the counter to indicate an increase of data when data is transferred into the buffer memory, and for changing the count value of the counter to indicate a decrease of data when data is transferred out of the buffer memory;

c. comparison means, coupled to the counter, for indicating to the microprocessor at least one of the conditions that the amount of data in the buffer memory equals (1) an "almost empty" preset comparison value or (2) an "almost full" preset comparison value;

wherein data is transferred between the interface processor and the input/output device controller only when the amount of data in the buffer memory at least equals the preset comparison value while the data flow control means is operating; and wherein the "almost empty" and "almost full" indications enable the microprocessor to maintain an essentially continuous flow of data between the interface processor and the input/output device controller.

2. The buffer memory data flow controller of claim 1, further including comparison means, coupled to the counter, for indicating to the microprocessor that the buffer memory is essentially full of data.

3. A buffer memory data flow controller, coupled to a microprocessor, a buffer controller, a buffer memory, an interface processor, and input/output device controller, for controlling the transfer of data between the interface and the input/output device controller, the data flow controller comprising:

a. a counter including validation means for generating a validation signal when the amount of data in the buffer memory equals a preset comparison value;

b. counter control means, coupled to the counter, for changing the count value of the counter to indicate an increase of data when data is transferred into the buffer memory, and for changing the count value of the counter to indicate a decrease of data when data is transferred out of the buffer memory;

c. pause signal generation means, coupled to the counter and the counter control means, for:

(1) generating an interface pause signal when the buffer memory is full during a transfer of data from the interface processor to the input/output device controller, or when the buffer memory is empty during a transfer of data from the input/output device controller to the interface processor; and (2) generating an input/output device controller pause signal when the buffer memory is empty during a transfer of data from the interface processor to the input/output device controller, or when the buffer memory is full during a transfer of data from the input/output device controller to the interface processor;

wherein data is transferred between the interface processor and the input/output device controller only when the amount of data in the buffer memory at least equals the preset comparison value while the data flow control means is operating; and wherein data is not transferred between the interface processor and the buffer memory if the interface pause signal is generated, and data is not transferred between the input/output device controller and the buffer memory if the input/output device pause signal is generated.

4. The buffer memory data flow controller of claim 3, further including comparison means, coupled to the counter, for indicating to the microprocessor at least one of the conditions that the amount of data in the buffer memory equals (1) an "almost empty" preset comparison value or (2) an "almost full" preset comparison value.

5. A buffer memory data flow controller system comprising:

a. microprocessor means for controlling the operation of the buffer memory data flow controller system;

b. buffer memory means for storing data;

c. buffer controller means, coupled to the microprocessor means and the buffer memory means, for controlling writing of data into and reading data out of the buffer memory means;

d. interface means, coupled to the microprocessor means, a data bus, and the buffer controller means, for controllably transmitting data between the data bus and the buffer memory means through the buffer controller means;

e. input/output device controller means, coupled to the microprocessor means, an input/output device, and the buffer controller means, for controllably transmitting data between the input/output device and the buffer memory means through the buffer controller means;

f. data flow control means, coupled to the microprocessor means, the buffer controller means, the interface means, and the input/output device controller means, for controlling the transfer of data between the interface means and the input/output device controller means, the data flow control means comprising:

(1) a counter including validation means for generating a validation signal when the amount of data in the buffer memory means equals a preset comparison value;

(2) counter control means, coupled to the counter, for changing the count value of the counter to indicate an increase of data when data is transferred into the buffer memory means, and for changing the count value of the counter to indicate a decrease of data when data is transferred out of the buffer memory means;

wherein data is transferred between the interface means and the input/output device controller means only when the amount of data in the buffer memory means at least equals the preset comparison value while the data flow control means is operating.

6. The buffer memory data flow controller system of claim 5, wherein the data flow control means further includes comparison means, coupled to the counter, for indicating to the microprocessor means at least one of the conditions that the amount of data in the buffer memory means equals (1) an "almost empty" preset comparison value or (2) an "almost full" preset comparison value.

7. The buffer memory data flow controller system of claim 5, wherein the data flow control means further includes comparison means, coupled to the counter, for indicating to the microprocessor means that the buffer memory means is essentially full of data.

8. The buffer memory data flow controller system of claim 5, wherein the data flow control means further includes pause signal generation means, coupled to the counter and the counter control means, for:

a. generating an interface pause signal when the buffer memory means is full during a transfer of data from the interface means to the input/output device controller means, or when the buffer memory means is empty during a transfer of data from the input/output device controller means to the interface means; and b. generating a input/output device controller pause signal when the buffer memory means is empty during a transfer of data from the interface means to the input/output device controller means, or when the buffer memory means is full during a transfer of data from the input/output device controller means to the interface means;

wherein data is not transferred between the interface means and the buffer memory means if the interface pause signal is generated, and data is not transferred between the input/output device controller means and the buffer memory means if the input/output device pause signal is generated.

9. A buffer memory data flow controller system comprising:
 a. microprocessor means for controlling the operation of the buffer memory data flow controller system;
 b. buffer memory means for storing data;
 c. buffer controller means, coupled to the microprocessor means and the buffer memory means, for controlling writing of data into and reading data out of the buffer memory means;
 d. interface means, coupled to the microprocessor means, a data bus, and the buffer controller means, for controllably transmitting data between the data bus and the buffer memory means through the buffer controller means;
 e. input/output device controller means, coupled to the microprocessor means, an input/output device, and the buffer controller means, for controllably transmitting data between the input/output device and the buffer memory means through the buffer controller means;
 f. data flow control means, coupled to the microprocessor means, the buffer controller means, the interface means, and the input/output device controller means, for controlling the transfer of data between the interface means and the input/output device controller means, the data flow control means comprising:
  (1) a pre-settable counter including validation means for generating a validation signal when the amount of data in the buffer memory means equals a preset comparison value;
  (2) counter control means, coupled to the counter, for changing the count value of the counter to indicate an increase of data when data is transferred into the buffer memory means, and for changing the count value of the counter to indicate a decrease of data when data is transferred out of the buffer memory means;
  (3) comparison means, coupled to the counter, for indicating to the microprocessor means at least one of the conditions that the amount of data in the buffer memory means equals (1) an "almost empty" preset comparison value or (2) an "almost full" preset comparison value;
  (4) pause signal generation means, coupled to the counter and the counter control means,
   (a) for generating an interface pause signal when the buffer memory means is full during a transfer of data from the data bus to the input/output device, or when the buffer memory means is empty during a transfer of data from the input/output device to the data bus;
   (b) for generating a input/output device controller pause signal when the buffer memory means is empty during a transfer of data from the data bus to the input/output device, or when the buffer memory means is full during a transfer of data from the input/output device to the data bus;

wherein data is transferred between the interface means and the input/output device controller means only when the amount of data in the buffer memory means at least equals the present comparison value while the data flow control means is operating; and wherein data is not transferred between the interface means and the buffer memory means if the interface pause signal is generated, and data is not transferred between the input/output device controller means and the buffer memory means if the input/output device pause signal is generated.

10. A method for controlling the transfer of data between a data bus and an input/output device through a buffer memory, the method comprising the steps of:
 a. keeping count of the amount of data in the buffer memory;
 b. changing the count value to indicate an increase of data when data is transferred into the buffer memory;
 c. changing the count value to indicate a decrease of data when data is transferred out of the buffer memory;
 d. generating a validation signal when the amount of data in the buffer memory equals a preset comparison value;
 e. generating an interface pause signal when the buffer memory is full during a transfer of data from the data bus to the input/output device, or when the buffer memory is empty during a transfer of data from the input/output device to the data bus;
 f. generating a input/output device controller pause signal when the buffer memory is empty during a transfer of data from the data bus to the input/output device, or when the buffer memory is full during a transfer of data from the input/output device to the data bus;
 g. enabling the transfer of data between the data bus and the input/output device only when the amount of data in the buffer memory at least equals the preset comparison value; and
 h. disabling data transfers between the data bus and the buffer memory if the interface pause signal is generated;
 i. disabling data transfers between the input/output device and the buffer memory if the input/output device pause signal is generated.

11. A method for controlling the transfer of data between a data bus and an input/output device through a buffer memory, the method comprising the steps of:
 a. changing the count value of a counter to indicate an increase of data when data is transferred into the buffer memory;
 b. changing the count value of a counter to indicate a decrease of data when data is transferred out of the buffer memory;
 c. generating a validation signal from the counter when the amount of data in the buffer memory equals a preset comparison value;

d. generating an interface pause signal when the buffer memory is full during a transfer of data from the data bus to the input/output device, or when the buffer memory is empty during a transfer of data from the input/output device to the data bus;

e. generating a input/output device controller pause signal when the buffer memory is empty during a transfer of data from the data bus to the input/output device, or when the buffer memory is full during a transfer of data from the input/output device to the data bus;

f. enabling the transfer of data between the data bus and the input/output device only when the amount of data in the buffer memory at least equals the preset comparison value; and g. disabling data transfers between the data bus and the buffer memory if the interface pause signal is generated;

h. disabling data transfers between the input/output device and the buffer memory if the input/output device pause signal is generated.

12. A buffer memory data flow controller system comprising:

a. a microprocessor for controlling the operation of the buffer memory data flow controller system;

b. a buffer memory for storing data;

c. a buffer controller, coupled to the microprocessor and the buffer memory, for controlling writing of data into and reading data out of the buffer memory;

d. a SCSI interface processor, coupled to the microprocessor, a SCSI data bus, and the buffer controller, for controllably transmitting data between the data bus and the buffer memory through the buffer controller;

e. an input/output device controller, coupled to the microprocessor, an input/output device, and the buffer controller, for controllably transmitting data between the input/output device and the buffer memory through the buffer controller;

f. a data flow controller, coupled to the microprocessor, the buffer controller, the SCSI interface processor, and the input/output device controller, for controlling the transfer of data between the SCSI interface processor and the input/output device controller, the data flow control comprising:

(1) a pre-settable counter including validation means for generating a validation signal when the amount of data in the buffer memory equals a preset comparison value;

(2) a counter controller, coupled to the counter, for changing the count value of the counter to indicate an increase of data when data is transferred into the buffer memory, and for changing the count value of the counter to indicate a decrease of data when data is transferred out of the buffer memory;

(3) a comparator, coupled to the counter, for indicating to the microprocessor at least one of the conditions that the amount of data in the buffer memory equals (1) an "almost empty" preset comparison value or (2) an "almost full" preset comparison value;

(4) a pause signal generator, coupled to the counter and the counter controller, (a) for generating an interface pause signal when the buffer memory is full during a transfer of data from the data bus to the input/output device, or when the buffer memory is empty during a transfer of data from the input/output device to the data bus;

(b) for generating a input/output device controller pause signal when the buffer memory is empty during a transfer of data from the data bus to the input/output device, or when the buffer memory is full during a transfer of data from the input/output device to the data bus;

wherein data is transferred between the SCSI interface processor and the input/output device controller only when the amount of data in the buffer memory at least equals the preset comparison value while the data flow control is operating; and wherein data is not transferred between the SCSI interface processor and the buffer memory if the interface pause signal is generated, and data is not transferred between the input/output device controller and the buffer memory if the input/output device pause signal is generated.

13. The buffer memory data flow controller of claims 1, 3, or 12, further including transfer completion signal generation means for indicating at least one of (1) the completion of a transfer from the interface processor to the buffer memory, or (2) the completion of a transfer from the input/output device controller to the buffer memory, thereby enabling subsequent transfer of all of the data out of the buffer memory without regard to the preset comparison value.

14. The buffer memory data flow controller of claims 5 or 9, further including transfer completion signal generation means for indicating at least one of (1) the completion of a transfer from the interface means to the buffer memory means, or (2) the completion of a transfer from the input/output device controller means to the buffer memory means, thereby enabling subsequent transfer of all of the data out of the buffer memory without regard to the present comparison value.

15. The buffer memory data flow controller of claims 1 or 3, wherein data is transferred to and from the input/output device controller in sectors, and data transfers between the interface processor and the input/output device controller are paused on a sector boundary.

16. The buffer memory data flow controller of claims 5 or 9, wherein data is transferred to and from the input/output device controller means in sectors, and data transfers between the interface processor means and the input/output device controller means are paused on a sector boundary.

17. The buffer memory data flow controller of claims 1, 3, or 12, wherein data is transferred to and from the input/output device controller in sectors, and the preset comparison value is at least the size of a sector.

18. The buffer memory data flow controller of claims 5 or 9, wherein data is transferred to and from the input/output device controller means in sectors, and the preset comparison value is at least the size of a sector.

19. The buffer memory data flow controller of claims 1, 3, 5, 9, or 12, wherein the preset comparison value is a positive value.

20. The buffer memory data flow controller of claims 1, 3, 5, 9, or 12, wherein the preset comparison value is a negative value.

21. The buffer memory data flow controller of claims 1, 3, 5, 9, or 12, wherein the preset comparison value is dynamically changed during operation of the buffer memory data flow controller.

22. The buffer memory data flow controller of claims 1, 3, 5, 9, or 12, wherein the counter has a sign output, and the validation signal is the value of the sign output of the counter.

23. A method for controlling the transfer of data between a data bus and an input/output device through a buffer memory, the method comprising the steps of:
 a. changing the count value of a counter to indicate an increase of data when data is transferred into the buffer memory;
 b. changing the count value of a counter to indicate a decrease of data when data is transferred out of the buffer memory;
 c. generating a validation signal from the counter when the amount of data in the buffer memory equals a preset comparison value;
 d. determining at least one of the conditions that the amount of data in the buffer memory equals (1) an "almost empty" preset comparison value or (2) an "almost full" preset comparison value;
 e. enabling the transfer of data between the data bus and the input/output device only when the amount of data in the buffer memory at least equals the preset comparison value; and
 f. maintaining an essentially continuous flow of data between the interface processor and the input/output device controller in response to the "almost empty" or "almost full" conditions.

24. The method of claims 10, 11, 23, further including the steps of:
 a. indicating completion of a transfer of data into the buffer memory;
 b. enabling, in response to such indication of completion, a subsequent transfer of all of the data out of the buffer memory without regard to the present comparison value.

25. The method of claims 10, 11, 23, wherein data is transferred to and from the input/output device in sectors, further including the step of pausing data transfers between the data bus and the input/output device on a sector boundary.

26. The method of claims 10, 11, or 23, wherein data is transferred to and from the input/output device in sectors, further including the step of setting the preset comparison value to at least the size of a sector.

27. The method of claims 10, 11, 23, further including the step of setting the preset comparison value to a positive value.

28. The method of claims 10, 11, or 23, further including the step of setting the preset comparison value to a negative value.

29. The method of claims 10, 11, or 23, further including the step of changing the preset comparison value dynamically during operation of the buffer memory data flow controller.

30. The method of claims 10, 11, or 23, wherein the counter has a sign output, and the validation signal is the value of the sign output of the counter.

* * * * *